(12) United States Patent
Moretz et al.

(10) Patent No.: US 8,534,642 B2
(45) Date of Patent: Sep. 17, 2013

(54) SEAL MEMBER FOR FLUID TRANSFER SYSTEM

(76) Inventors: Dale Moretz, Jackson, MI (US); Carl Romack, Ann Arbor, MI (US)

( * ) Notice: Subject to any disclaimer, the term of this patent is extended or adjusted under 35 U.S.C. 154(b) by 0 days.

(21) Appl. No.: 13/147,458

(22) PCT Filed: Feb. 2, 2010

(86) PCT No.: PCT/US2010/022863
§ 371 (c)(1),
(2), (4) Date: May 17, 2012

(87) PCT Pub. No.: WO2010/088656
PCT Pub. Date: Aug. 5, 2010

(65) Prior Publication Data
US 2012/0267559 A1    Oct. 25, 2012

Related U.S. Application Data

(60) Provisional application No. 61/149,256, filed on Feb. 2, 2009.

(51) Int. Cl.
*F16K 5/00*    (2006.01)
*F16K 25/00*    (2006.01)
*F16K 11/083*    (2006.01)

(52) U.S. Cl.
USPC ....... 251/314; 251/175; 251/181; 137/625.16

(58) Field of Classification Search
USPC .................... 251/314, 317.01, 317, 316, 175, 251/176, 180, 181, 192, 309; 137/625.11, 137/625.15, 625.16
See application file for complete search history.

(56) References Cited

U.S. PATENT DOCUMENTS 2,844,353 A * 7/1958 Gurries ..................... 251/175
3,542,072 A  11/1970 Harris, Sr.
(Continued)

FOREIGN PATENT DOCUMENTS

AT    002806    4/1999
DE    10064671    6/2002
(Continued)

OTHER PUBLICATIONS

PCT International Search Report—PCT/US2010/022863, Aug. 26, 2010.

(Continued)

*Primary Examiner* — John K Fristoe, Jr.
*Assistant Examiner* — Michael R Reid
(74) *Attorney, Agent, or Firm* — Dickinson Wright PLLC

(57) ABSTRACT

The specification discloses a seal member for selectively completing a fluid passageway defined between an upstream member and a downstream member separated by an intermediate space, the seal member comprising an elongate stem portion dimensioned to be movably positionable in an opening defined through the upstream member between opposite first and second surfaces thereof, the elongate stem portion having provided at one end thereof a resiliency deformable, radially-extending flange and at the other end thereof a sealing face, and a fluid passageway defined through the stem portion between the flange and the sealing face. The flange is deformable under fluid pressure to increase the area of contact between the flange and the first surface of the upstream member and to simultaneously move the stem portion within the opening defined in the upstream member so as to bring the sealing face into sealing contact with an opposing surface of the downstream member across the intermediate space.

17 Claims, 10 Drawing Sheets

(56) References Cited

U.S. PATENT DOCUMENTS

| | | | |
|---|---|---|---|
| 3,707,891 A | | 1/1973 | Asano et al. |
| 3,910,554 A | * | 10/1975 | Speedie .................. 251/208 |
| 4,345,622 A | | 8/1982 | Henningsson |
| 4,566,355 A | | 1/1986 | Sugano |
| 4,658,859 A | | 4/1987 | Backe et al. |
| 4,836,249 A | | 6/1989 | LaPointe |
| 4,880,032 A | | 11/1989 | Doutt |
| 5,188,144 A | * | 2/1993 | Radossi .................. 137/315.25 |
| 6,237,628 B1 | | 5/2001 | Miller et al. |
| 6,290,208 B1 | | 9/2001 | Arnett |
| 6,554,249 B2 | * | 4/2003 | Pang et al. .................. 251/174 |
| 2007/0107787 A1 | * | 5/2007 | Moretz .................. 137/625.11 |
| 2009/0090238 A1 | | 4/2009 | Friedrich |

FOREIGN PATENT DOCUMENTS

| | | |
|---|---|---|
| DE | 10152186 | 6/2003 |
| EP | 0201470 | 12/1986 |
| EP | 0628753 | 12/1994 |
| GB | 774912 | 5/1957 |
| JP | 9324883 | 12/1997 |
| JP | 2007092827 | 4/2007 |
| KR | 20020065878 | 8/2002 |
| KR | 20050002672 | 1/2005 |
| KR | 1020080113028 | 12/2008 |

OTHER PUBLICATIONS

PCT Written Opinion—PCT/US2010/022863, Aug. 26, 2010.
PCT International Preliminary Report on Patentability—PCT/US2010/022863, Aug. 2, 2011.
PCT International Search Report—PCT/US20101031503, Nov. 5, 2010.
Nov. 5, 2010 PCT Written Opinion—PCT/US20101031503, Nov. 5, 2010.
PCT International Preliminary Report on Patentability—PCT/US2010/031503, Oct. 18, 2011.

* cited by examiner

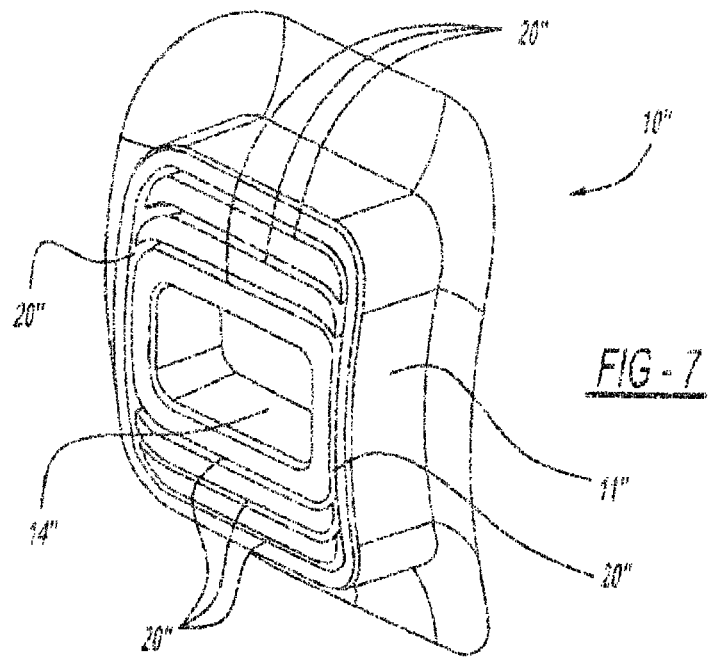
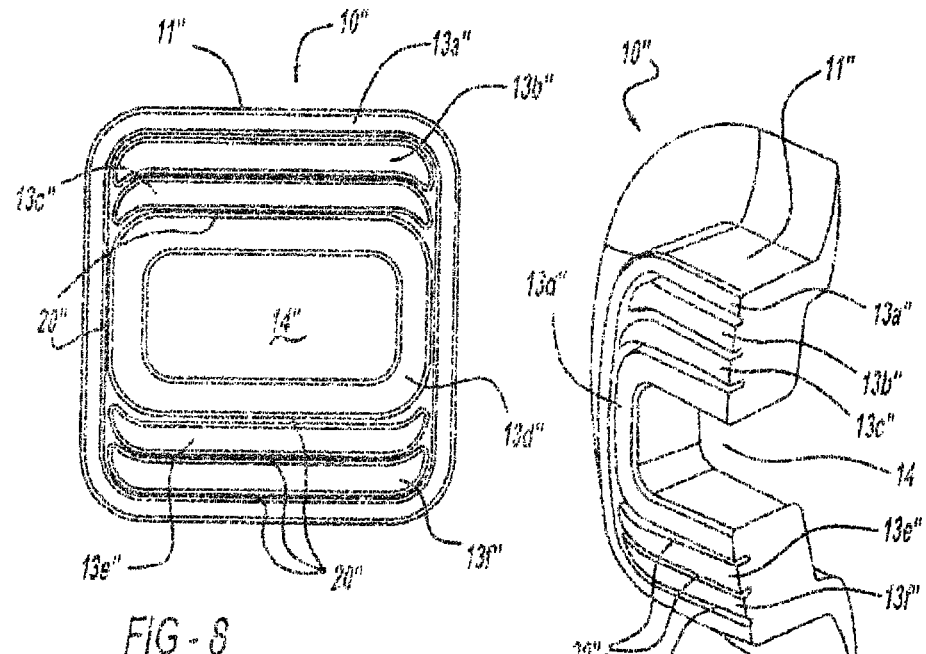

SEAL MEMBER FOR FLUID TRANSFER SYSTEM

CROSS-REFERENCE TO RELATED APPLICATIONS

The present application is a 35 U.S.C. §371 national stage filing of International Patent Application No. PCT/US2010/022863, filed Feb. 2, 2010, and through which priority is claimed to U.S. Provisional Patent Application No. 61/149,256, filed Feb. 2, 2009, the disclosures of which are incorporated herein by reference in their entireties.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

FIELD OF THE INVENTION

The present invention relates to the field of fluid transfer systems wherein a fluid is selectively transferred through a fluid passageway defined between an upstream member and a downstream member which are separated by an intermediate space, and more particularly to a seal member for such fluid transfer systems that is deformable under fluid pressure to selectively create sealing contact between the seal member and an opposing surface of the downstream member across the intermediate space.

BACKGROUND OF THE INVENTION

Fluid transfer systems—wherein a fluid is selectively transferred through a fluid passageway defined between an upstream member and a downstream member separated by an intermediate space—are known in a myriad of forms. In such systems, sealing means are employed to seal separate, but related, upstream and downstream components that cannot easily be permanently fused together, or which components otherwise need to be capable of engagement and disengagement and/or which are required to selectively move independently of each other. Such sealing means conventionally take a myriad of forms, including, without limitation, gaskets, O-rings, quad seals, sealing beads, lip seals, etc.

Unfortunately, sealing means of such conventional construction as the aforementioned are attended by a number of drawbacks. First, these sealing means generally require the maintenance of very consistent interface dimensions between the upstream and downstream components being sealed thereby, as conventional sealing means typically possess a limited capacity to compensate for variations in dimensional separation or geometric differences between the components. Even in the case of relatively dynamic sealing means, such as O-rings, quad seals, and lip seals, if there is even a relatively small change in either the distance between the upstream and downstream components or the geometric relationship therebetween, the sealing capacity of these conventional sealing means is compromised and the fluid seal may be lost.

It would thus be advantageous to have a seal member for a fluid transfer system which is capable of compensating for changes in either or both of the upstream and downstream components between which the seal is being established, and/or to compensate for changes in the dimensional or geometric relationships between the components.

SUMMARY OF THE DISCLOSURE

The present invention encompasses improvements to the prior art by providing a seal member for selectively completing a fluid passageway between an upstream member and a downstream member separated by an intermediate space, the seal member comprising an elongate stem portion dimensioned to be movably positionable in an opening defined through the upstream member between opposite first and second surfaces thereof, the elongate stem portion having provided at one end thereof a resiliently deformable, radially-extending flange and at the other end thereof a sealing face, and a fluid passageway defined through the stem portion between the flange and the sealing face. The flange is deformable under fluid pressure to increase the area of contact between the flange and the first surface of the upstream member and to simultaneously move the stem portion within the opening defined in the upstream member so as to bring the sealing face into sealing contact with an opposing surface of the downstream member across the intermediate space.

BRIEF DESCRIPTION OF THE DRAWINGS

For a better understanding of the present invention and to show more clearly how it may be carried into effect, reference will now be made, by way of example, to the accompanying drawings, which show an exemplary embodiment of the present invention, and in which:

FIG. 1b is a cross-sectional view of FIG. 1a;

FIG. 7 is a perspective view of a seal member according to a third embodiment;

FIG. 8 is a bottom plan view of the seal member of FIG. 7, the flange having been removed from view;

FIG. 9 is a cross-sectional view of the seal member of FIGS. 7 and 8;

WRITTEN DESCRIPTION

Figure 1A:
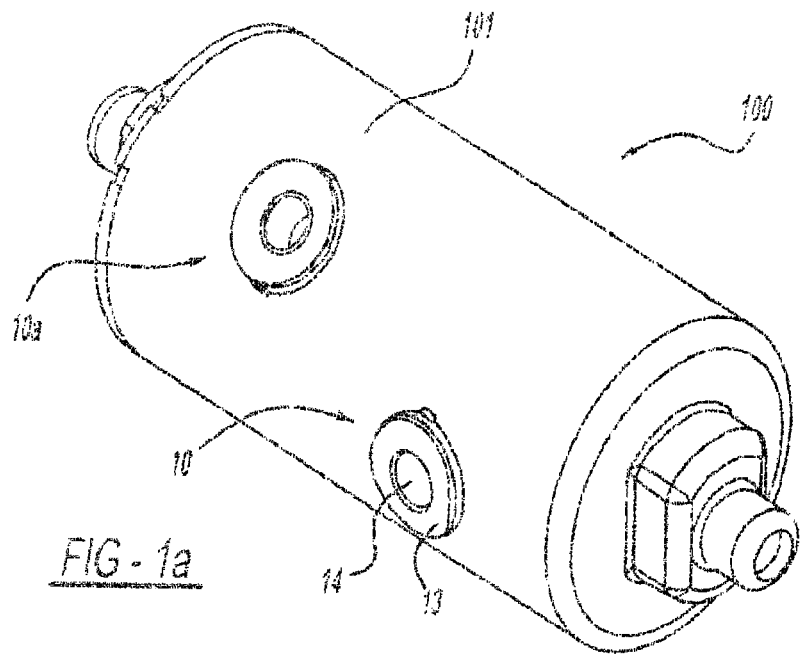
FIG. 1a is a quartering perspective view of a portion of an exemplary operational environment for the present inventive seal member, comprising a rotary valve for a vehicle automatic transmission system.

As required, detailed embodiments of the present invention are disclosed herein. However, it is to be understood that the disclosed embodiments are merely exemplary of the invention, which may be embodied in various and alternative forms. The accompanying drawings are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the drawings, wherein like numerals refer to like or corresponding parts throughput the several views, the present invention is generally characterized as a seal member for selectively completing a fluid passageway defined between an upstream member and a downstream member separated by an intermediate space, such as, by way of non-limiting example, as embodied in a rotary valve of the type disclosed in United States published application 2007/0107787, the disclosure of which is incorporated herein by reference in its entirety.

As disclosed in United States published application 2007/0107787, such a rotary valve comprises a downstream member in the form of a housing having an interior cavity, and an upstream member in the form of an inner member moveably disposed within the interior cavity of the downstream housing and separated therefrom by an intermediate space. The upstream, inner member has an interior cavity for holding a fluid, such as, for instance, hydraulic fluid for an automatic transmission system. At least one inlet passageway is defined through each of the downstream housing and the upstream, inner member, respectively, for communicating a fluid to the interior cavity of the inner member. Further, at least one outlet opening is provided through the wall of the upstream, inner member, to thus permit fluid communication from the interior cavity to the exterior of the inner member. Preferably, a plurality of such outlet openings are provided, each extending radially relative to the longitudinal axis of the inner member so as to terminate in about the circumference of the exterior surface of the inner member. Each of the outlet openings is arranged so that incremental rotational movement of the inner member will selectively bring at least one opening into communication with one of a plurality of passageways defined through the downstream housing.

As noted, the upstream inner member is selectively moveable relative to the housing, and incremental rotational movement of the upstream inner-member relative to the downstream housing may be accomplished by such exemplary motors as a stepper motor, variable solenoid, or servomotor, etc. By operation of the motor in response to a controller, the inner member is selectively rotatably moved relative to the downstream housing by an angular distance which brings a desired one or more of the outlet openings into radial alignment with one or more of the plurality of passageways defined through the housing, thereby permitting communication of a fluid from the interior cavity of the inner member through the housing (and thence, for instance, through an opening in a manifold to a selected one of the clutch activators) via the radially aligned passageways/openings.

Figure 1B:
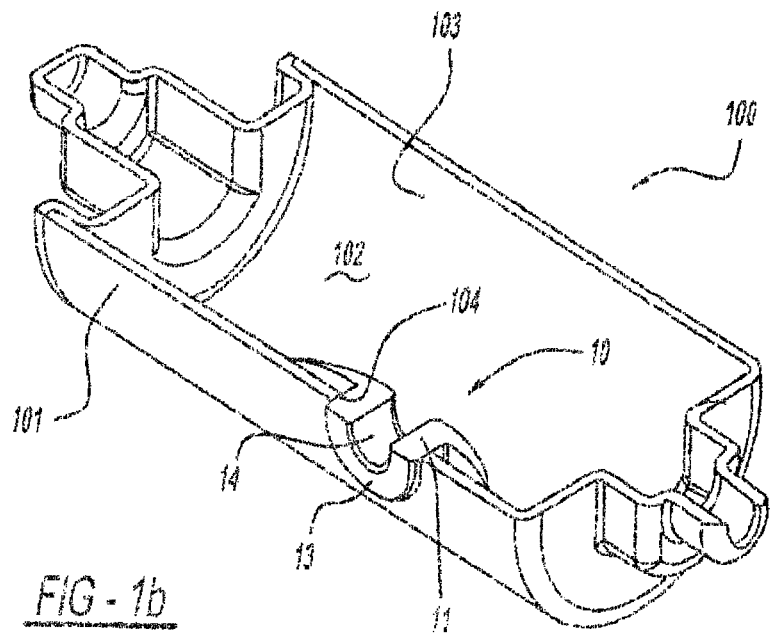
Figure 2:
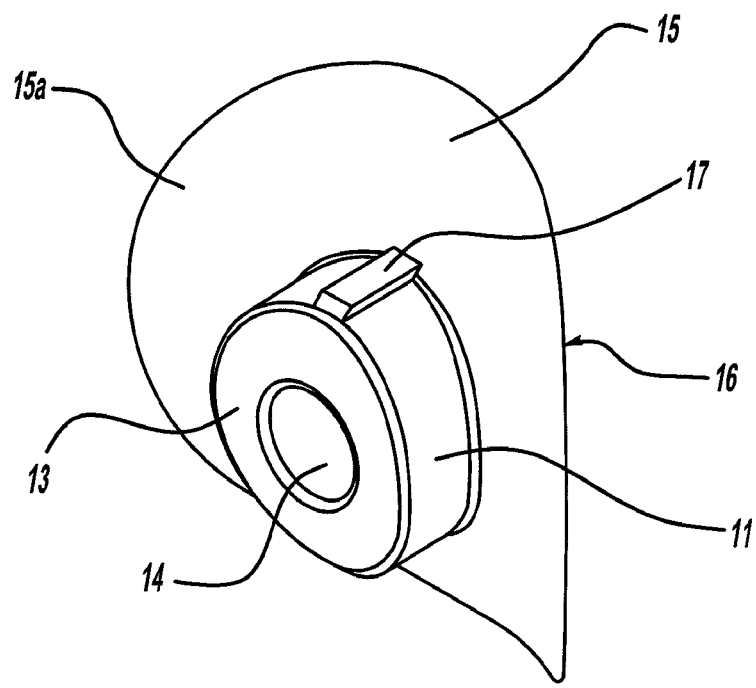
FIG. 2 a perspective view of one embodiment of the inventive seal member.
Figure 3:
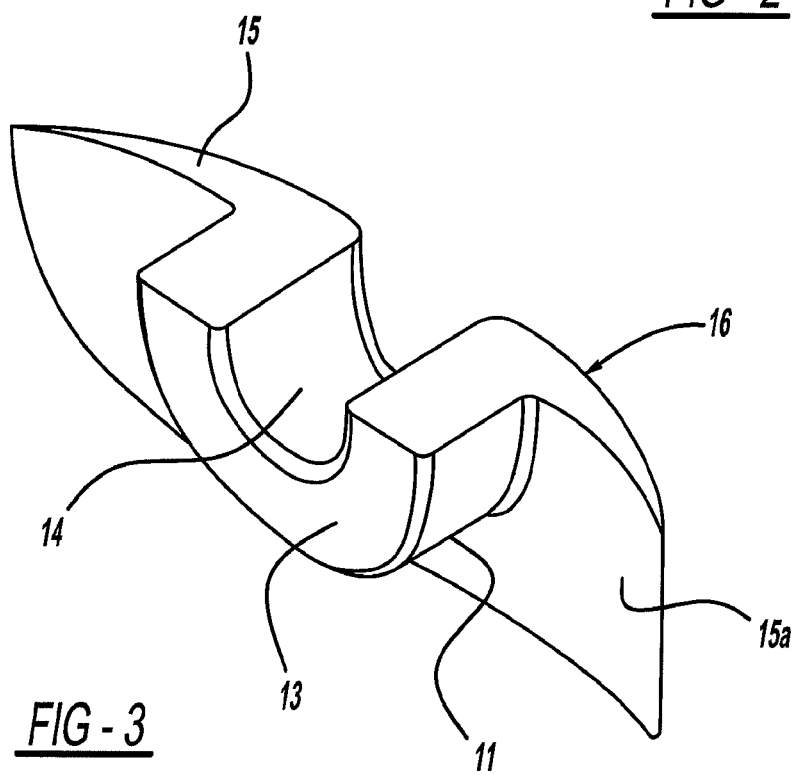
FIG. 3 is a cross-sectional view of the seal member of FIG. 2.

With reference now being had to FIGS. 1a and 1b, wherein the seal members 10, 10a are shown in an exemplary operational environment comprising a rotary valve for a vehicle automatic transmission system such as heretofore described—in which the illustrated upstream member for the fluid transfer system is in the form of an inner member 100 having an exterior surface 101, an interior cavity 102 defined by an interior surface 103, and at least one outlet opening 104 defined therethrough—and also to FIGS. 2 and 3, each seal member 10 (shown in cross-section in FIGS. 1b and 2) may be seen to basically comprise an elongate stem portion 11 dimensioned to be movably positionable in the outlet opening 104, a resiliently-deformable flange 15 provided at one end of the stem portion 11, a sealing face 13 provided at the opposite end of the stem portion 11, and a fluid passageway 14 defined through the stem portion between the flange and the sealing face.

The flange 15 is deformable under fluid pressure created in the upstream member in order to increase the area of contact between the flange 15 and the interior surface of the upstream member (per the illustrated embodiment, the interior surface 103 of the inner member 100) and to simultaneously move the stem portion 11 within the outlet opening (104 in the embodiment of FIGS. 1a and 1b) defined in the upstream member so as to bring the sealing face 13 into sealing contact with an opposing surface of the downstream member across the intermediate space defined therebetween (not depicted in FIGS. 1a through 3). In accomplishment of the foregoing, the flange 15 is, according to the illustrated embodiment, configured as an annular flange 15 of convex cross-section (as viewed from the top down where the flange 15 defines the top of the seal member 10 and the sealing face 13 defining the bottom) extending radially from a central axis of the seal member 10 defined coaxially with the longitudinal axis of the passageway 14. Referring particularly to FIGS. 2 and 3, flange 15 is further characterized by a tapered thickness proceeding radially outwardly from the said central axis to the flange peripheral edge 15a. The taper of the flange 15 is such that, according to the material from which the seal member 10 is manufactured and the pressure of a fluid acting on the upper surface 16 of the flange 15, such fluid pressure will cause deformation of the flange 15 in the manner described in more detail herein below. Of course, it will be appreciated that flange 15 may take any shape that is determined to be optimal for the particular sealing application, including, but not limited to, round, oval, square, or rectangular.

With continuing reference to FIG. 2, the seal member 10 may optionally be provided with one or more guide ribs 17 on the outer surface of the stem portion 11 to properly orient the seal member 10 within the outlet opening (e.g., 104) in which it is received. Depending upon the clearance between the walls of the opening (e.g., 104) in which the seal member 10 is received, that opening may further be provided with grooves (not shown) dimensioned to receive the one or more guide ribs 17 therein.

Figure 4:
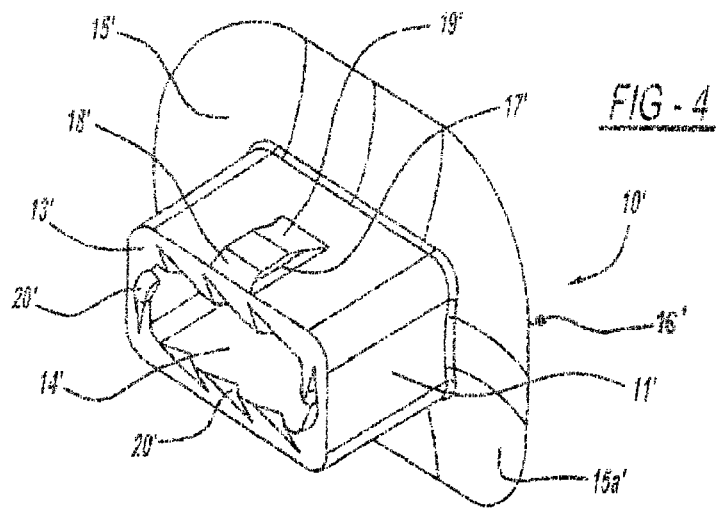
FIG. 4 is a perspective view of a seal member according to a second embodiment.
Figure 5:
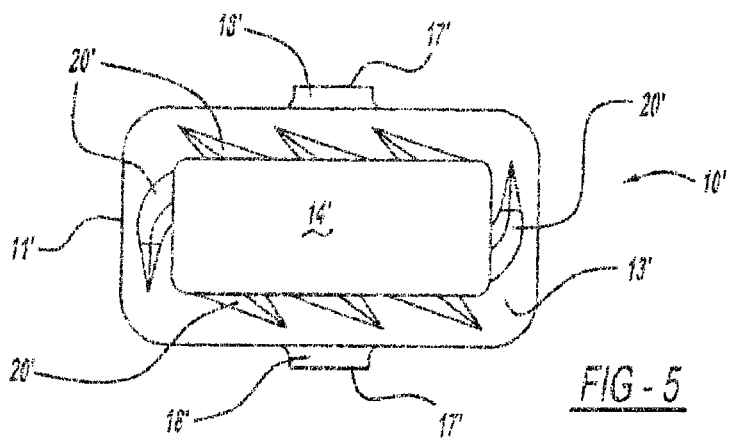
FIG. 5 is a bottom plan view of the seal member of FIG. 4, the flange having been removed from view.
Figure 6:
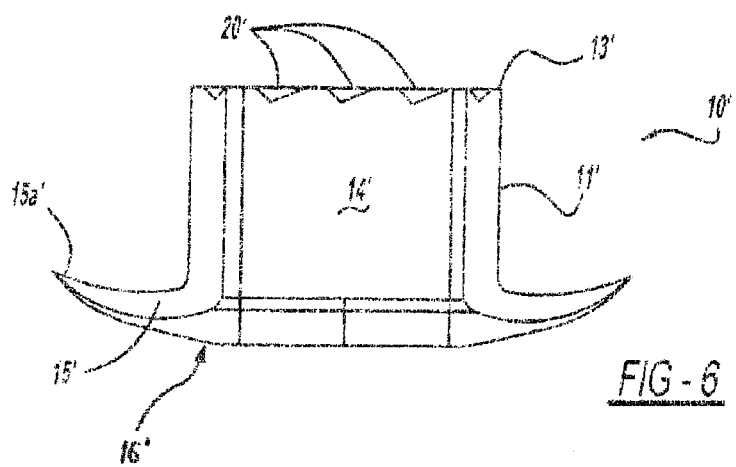
FIG. 6 is a cross-sectional view of the seal member of FIGS. 4 and 5.

With reference now being had to FIGS. 4 through 6, in which an alternate embodiment of the inventive seal member 10' is depicted, guide ribs 17' on the outer surface of the stemm portion 11' may further be configured, such as with the illustrated forward taper 18', so as to provide a ramp to facilitate insertion of the seal member into the opening in the upstream member (such as the inner member 100 of FIGS. 1*a* and 1*b*). A further reverse taper 19' positioned oppositely of the taper 18' may also be provided on each guide rib 17' to act as a bias urging the peripheral edge 15*a*' of flange 15' into contact with the first surface (e.g., 103 of FIGS. 1*a* and 1*b*) of the inner member (e.g., 100 of FIGS. 1*a* and 1*b*). It will be understood that such biasing is preferred where the peripheral edge 15*a*' of the flange 15' is not otherwise in sufficient contact with the first surface of the upstream member so as to prevent such fluid migration between the peripheral edge 15*a*' of flange 15' and that first surface that would tend to reduce or equalize the pressure of the fluid acting on upper surface 16' of the flange 15'. By urging the peripheral edge 15*a*' into contact with the first surface of the inner member, it will be appreciated that the sealing face 13' will simultaneously be urged further toward or, optionally, into provisional (i.e., non-sealing) contact with, the opposing surface of the downstream member.

With continuing reference to FIGS. 4 through 6, the inventive seal member 10' may further be provided with one or more grooves or channels 20' defined on the sealing face 13' thereof, such one or more grooves or channels allowing a fluid to enter the sealing interface between the sealing face 13' and the opposing surface of the downstream member so as to provide lubrication and a controlled force countering the force generated by the fluid pressure on the flange 15', thereby reducing friction between these surfaces. These grooves or channels 20' may be discrete, such as shown in FIGS. 4 through 6, or may comprise a continuous channel or groove 20" as shown in the alternate embodiment of FIGS. 7 through 9. Per the embodiment of FIGS. 4 through 6, the channels 20' can be seen to comprise tapered indentations in the surface of the sealing face 13', each indentation opening onto the surface defining passageway 14' so that a supply of fluid may be communicated from the passageway 14' and into each channel 20'. It will be understood that the dimensions of these channels can be varied to optimize their function depending on such considerations as the fluids, pressures, interface characteristics, etc.

According to the embodiment of FIGS. 7 through 9, a single continuous channel 20" is defined in the sealing face. Further to this embodiment, the arrangement of the various sections of the channel 20" may be seen to divide the sealing face into a plurality of discrete sealing faces 13*a*", 13*b*", 13*c*", 13*d*", 13*e*" and 13*f*". This design is suited to applications, such as described herein, where the rotational position of the seal member 10" in relation to the passageway defined in, and opening onto the opposing surface of, the downstream member is selectively varied in order to alter the dimensions of the fluid passage defined at this interface between passageway 14" (through the stem prtion 11') and the passageway in the downstream member. More particularly, as the rotational orientation of the seal member 10" is varied (by, for instance, incremental rotary movement of the upstream member) in relation to the passageway defined in the downstream member, the sealing faces 13*a*", 13*b*", 13*c*", 13*d*", 13*e*" and 13*f*" successively enable a momentary closing of the passageway.

It will be appreciated that the shape of the flange should be optimized to the geometry of the interior surface of the upstream member so as to facilitate formation of a fluid seal against that interior surface upon the application of sufficient fluid pressure. For instance, where that interior surface 103''' of the inner member 100''' is spherical, the cross-section shape of the flange 15''' may take the form depicted in FIG. 10. Alternatively, where the interior surface of the upstream member is flat, at least proximate to the location of the seal member, the shape of the flange is such that at least the peripheral edge thereof lies along a common plane so as to ensure sealing contact with that interior surface.

Figure 10:
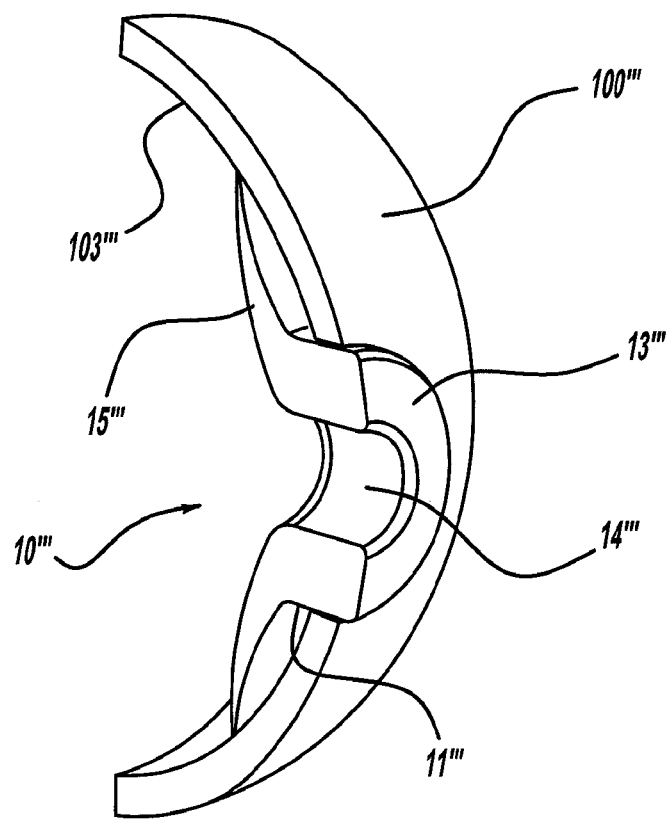
FIG. 10 is a cross-section view of a seal member according to a fourth embodiment.

Similarly, it will be understood that the surface geometry of the seal-member sealing-face should be optimized to the geometry of the opposing surface of the downstream member so as to form a fluid seal there against, whether the sealing face has to seal against a flat surface or, as with the illustrated sealing face 13''' of FIG. 10, against the surface of a cylinder or sphere (not depicted).

It is contemplated that the inventive seal member may be formed from a polymer, such as, by way of non-limiting example, an elastomeric material such as Nylon 46, with such polymeric construction being especially suited to relatively lower pressure applications. For comparatively intermediate pressure environments, a more rigid polymer may be employed. And, for relatively higher pressure applications (such as, by way of example only, aircraft hydraulic control systems, for instance), it is contemplated that the seal member may be fashioned from materials such as metals with varying degrees of elasticity, glass, glass-like or ceramic materials (particularly for applications requiring extreme chemical resistance), known composites and synthetic materials, etc.

With the benefit of this disclosure, those skilled in the art will appreciate that the material from which the sealing member is fashioned will depend upon the fluid pressure applied to the flange of the sealing member and the desired deflection thereof in response to such pressure, as well as the characteristics of the fluid and the potential chemical interaction between the same and the seal member, the operating temperature of the environment in which the seal member is employed, etc.

Figure 11:
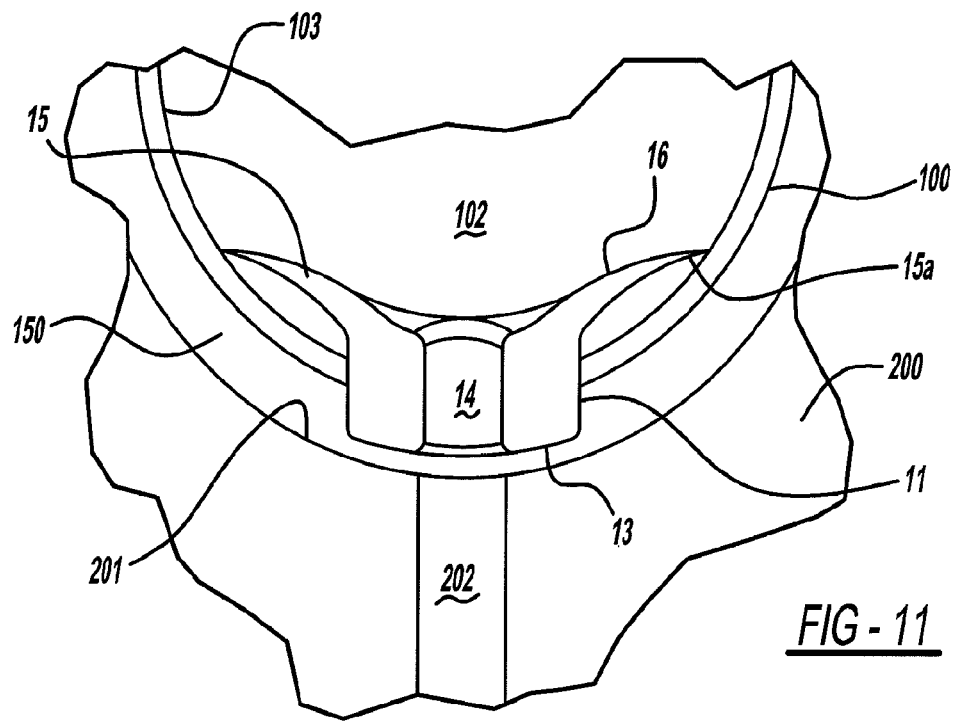
FIG. 11 is a cross-sectional view showing the seal member in an exemplary operational environment, and according to which the seal member is shown with the flange thereof in the default, un-deformed condition.
Figure 12:
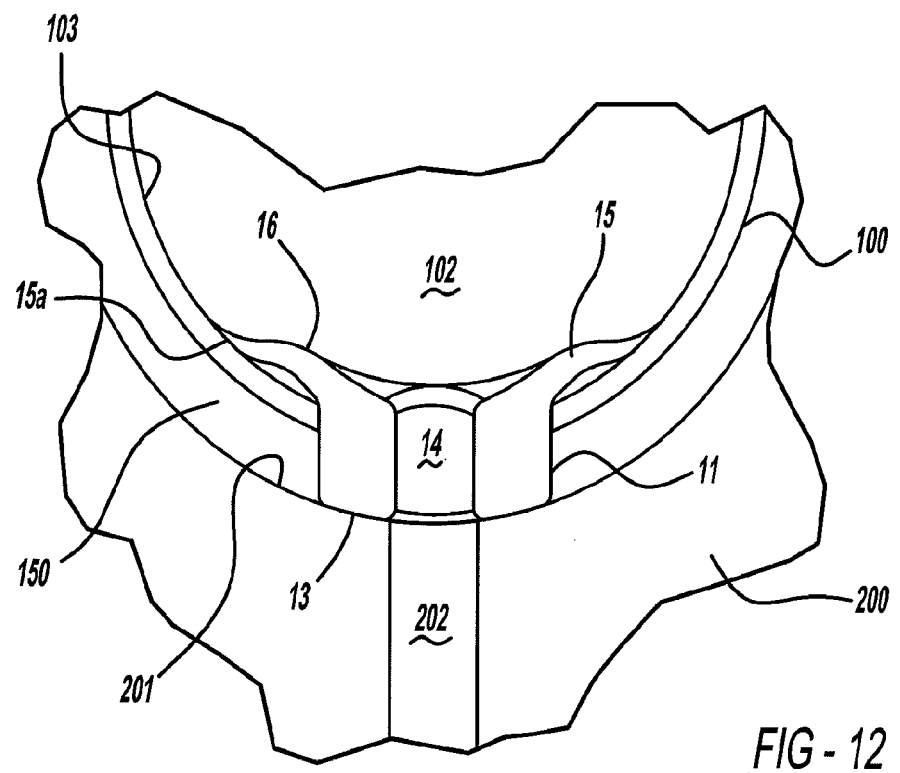
FIG. 12 depicts the seal member of FIG. 11 with the flange thereof in the deformed condition.
Figure 13:
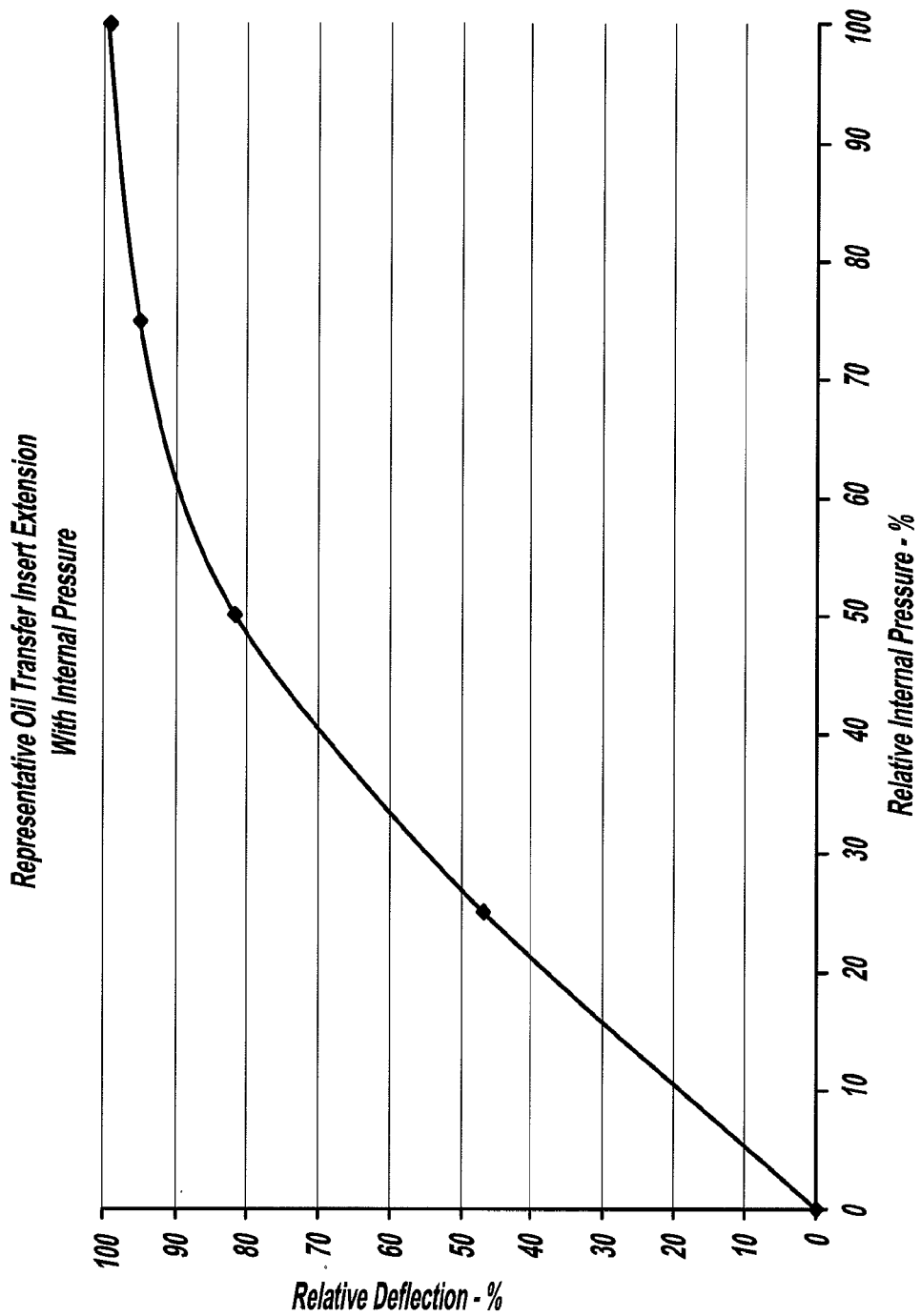
FIG. 13 is a graph depicting, in the form of a representative curve derived from experimental data, the relationship between the relative (as a percentage) fluid pressure acting on the seal member and the relative deflection (also as a percentage) of the seal member.
Figure 14:
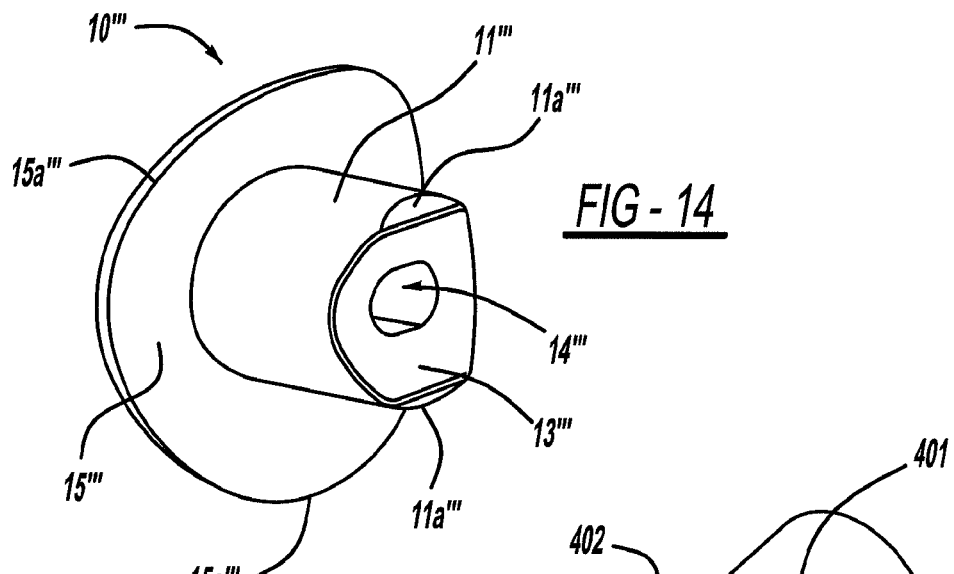
FIG. 14 depicts in perspective a seal member according to a further embodiment.
Figure 15:
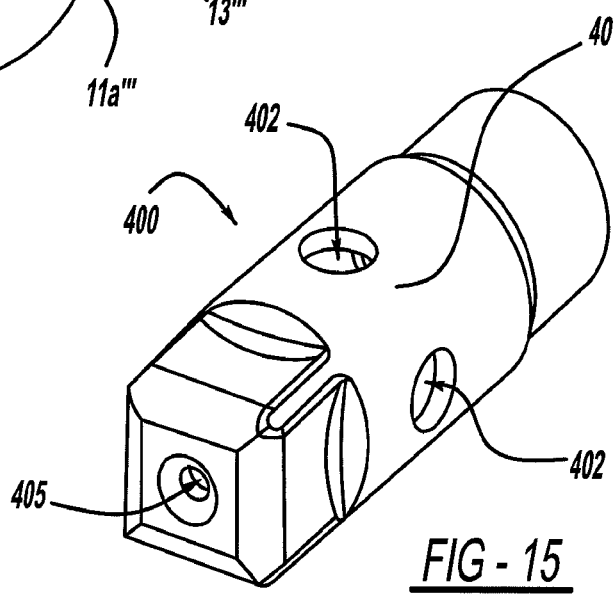
FIG. 15 is a perspective view of a downstream, inner member comprising part of an exemplary rotary valve in which the seal member of the present invention may be employed.
Figure 16:
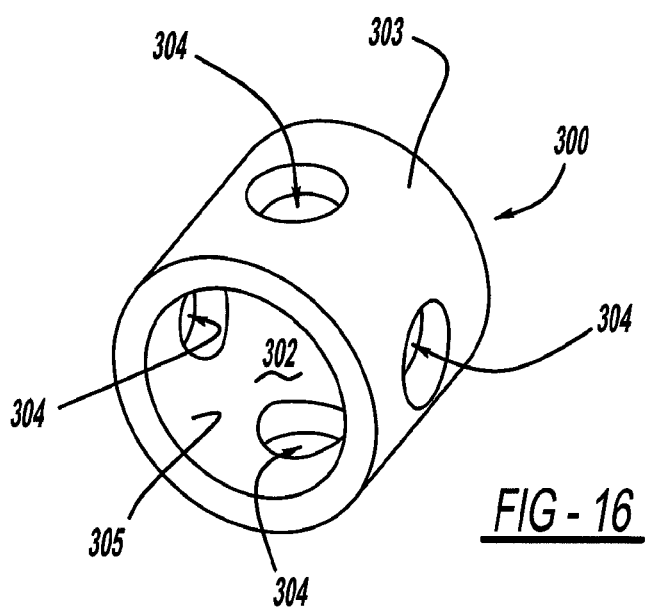
FIG. 16 is a perspective view of an upstream, outer member comprising part of an exemplary rotary valve in which the seal member of the present invention may be employed.

Turning now to FIGS. 1*a* and 1*b*, as well as FIGS. 11 through 13, the inventive seal member as heretofore described may be employed, for example, in a rotary valve for selectively porting a fluid through one or more outlets, and thence to one or more downstream elements which may be actuated by such fluid (including, for instance, clutches). According to the exemplary embodiment of the downstream housing 200 and upstream inner-member 100 herein contemplated, the one or more components thereof may be formed from any suitably strong and rigid materials, including, by way of non-limiting example, metals such as aluminum, zinc, or magnesium, rigid polymers, including, for instance, reinforced (such as, for example, with fiberglass or carbon fiber) polymers. Relatedly, these one or more components may be formed by any conventional means, including, without limitation, die-casting. As will be appreciated from this disclosure, the downstream and upstream members need not be deformable in the manner described in United States published application 2007/0107787, since the inventive seal member is itself deformable under pressure as described herein to create sealing contact between the upstream and downstream members across the intermediate space that separates them.

Referring specifically to FIGS. 1*a* and 1*b*, where the upstream member constitutes the inner member 100 heretofore described, it will be seen that a plurality of seal members 10 are positioned in the outlet openings 104 provided therethrough, each such seal member having, as noted, a passageway 14 through the stem portion 11 which may be selectively radially aligned with an outlet passageway defined through the downstream housing (not shown) in which the upstream member 100 is disposed.

Referring also to FIGS. 11 and 12, by rotational movement of the upstream member 100 relative to the downstream housing 200, each of one or more of the seal members 10 is oriented so that its passageway 14 is aligned with one of a plurality of passageways 202 in the housing 200 (FIG. 11); the remaining seal members 10 (not shown) in this orientation are not so aligned, but are instead positioned to oppose surfaces 201 of the downstream housing 200 lacking outlet passageways. A fluid under pressure thereafter introduced into the interior cavity 102 of the upstream member 100 acts against the upper surface 16 of each flange 15 as the fluid simultaneously leaves the interior cavity 102 via the passageways 14. By the configuration thereof as shown and described, flange 15 becomes gradually flattened against the first surface 103 of the upstream member 100, from the peripheral edge 15a and proceeding radially inwardly toward the increasingly thicker portion of the flange, thus "grounding" successively more of the flange 15 against that interior surface 103 and reducing the rate at which additional force applied by the increasing fluid pressure is transferred to the seal member 10. Concurrently, the stem portion 11 is moved within opening 104 until the sealing face 13 comes into sealing contact with the opposing surface 201 of the downstream housing 200 across the intermediate space 150 (FIG. 12).

Where the seal member 10 is positioned in alignment with an outlet passageway 202 in the downstream housing, such as shown in FIGS. 11 and 12, the fluid is communicated from the interior cavity 102 to the outlet passageway 202 via the passageway 14. Where, in contrast, the seal member 10 is misaligned relative to any of the outlet passageways 202, sealing contact between the sealing face 13 and the surface 201 of the housing 200 results in the fluid being trapped in the passageway 14.

By the configuration thereof as shown and described, flange 15 is able to provide a positive seal against the first surface (e.g., 103) of the upstream member (e.g., inner member 100) with a minimum of pressure applied to the upper surface 16 thereof and, moreover, as fluid pressure acting on surface 16 is increased, the flange 15 becomes gradually flattened against that first surface, from the peripheral edge 15a and proceeding radially inwardly toward the increasingly thicker portion of the flange, thus "grounding" successively more of the flange 15 against the interior surface 103 of the upstream member 100 and reducing the rate at which additional force applied by the increasing fluid pressure is transferred to the seal member 10. Also by configuration of the flange 15 as described herein, the rate of increase in pressure exerted on the seal member 10 forcing the sealing face 13 against the opposing surface 202 of the downstream member 200 gradually decreases as the delivery pressure of the fluid rises. This behavior of the flange is shown graphically in FIG. 13, which depicts a representative curve, derived from experimental data, plotting the relationship between the relative (as a percentage) fluid pressure acting on the seal-member flange and the relative deflection (also as a percentage) of the seal member of the flange.

Referring next to FIGS. 14 through 18, there is shown an alternative embodiment wherein the upstream member comprises outer member 300 and the downstream member comprises an inner member 400 disposed therein, and wherein further one or more seal members 10''' are movably positionable in a corresponding opening 304 defined through the upstream member 300. Still more particularly, upstream member 300 according to the illustrated embodiment comprises a cylindrically-shaped member having opposite first 303 and second 305 surfaces, and defining an interior cavity 302. One or more openings 304 defined through upstream, outer member 300 between the opposing surfaces 303 and 305 is provided, each such opening receiving the stem portion 11''' of a seal member 10'''. As shown, a plurality of openings 304 are provided in the outer member 300 of the illustrated embodiment, one for each of a plurality of seal members 10''', the openings being disposed equidistant from each other about the circumference of the outer member.

Disposed within cavity 302, and separated from outer member 300 by intermediate space 350 is the downstream, inner member 400. As depicted, inner member 400 takes the form of a stem having a longitudinal passageway 405 and at least one passageway 402 extending from an opening at outer surface 401 and inwardly into communication with longitudinal passageway 405. As shown, a plurality of such passageways 402 are provided in the inner member 400 of the illustrated embodiment, the openings thereof being disposed equidistant from each other about the circumference of the inner member and the passageways being in radial alignment with the openings 304.

Figure 17:
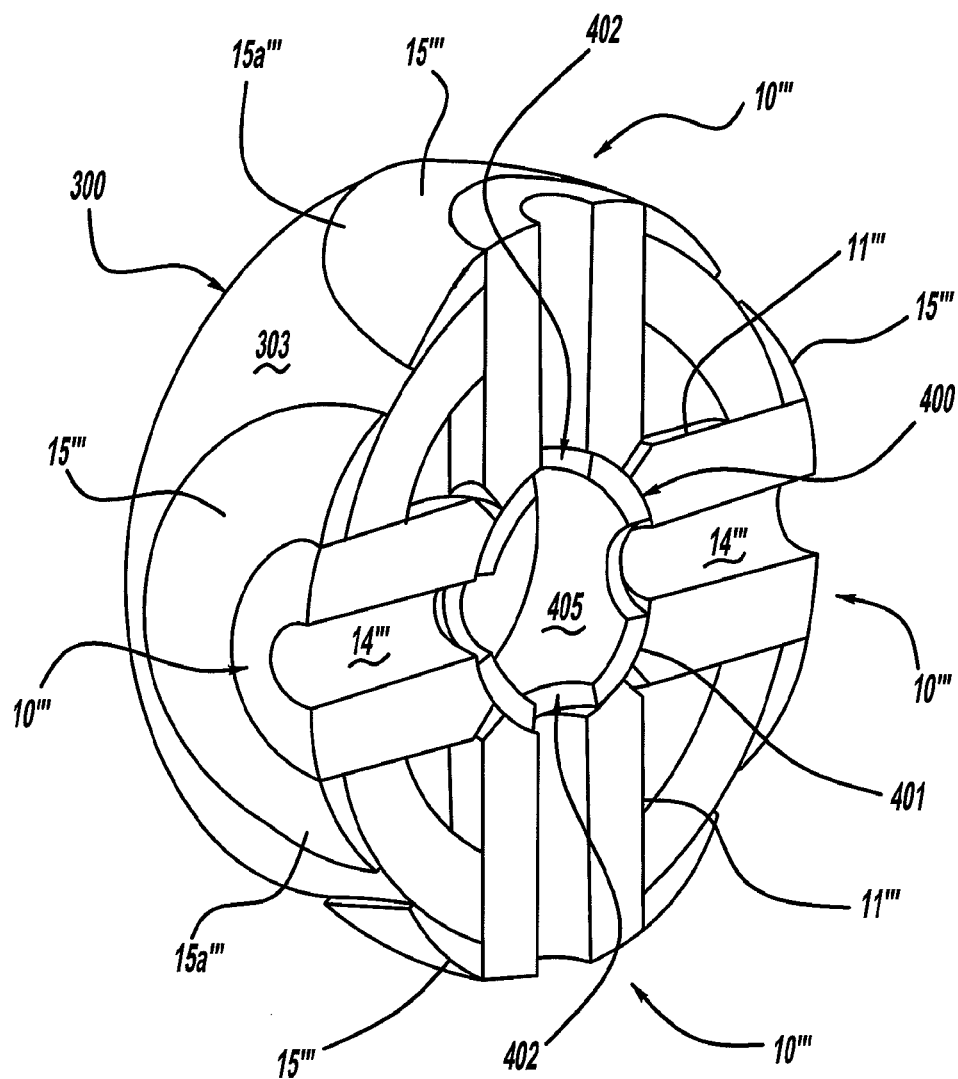
FIG. 17 is a perspective, cross-sectional view of an exemplary rotary valve comprising the inner and outer members of FIGS. 15 and 16, and the seal member of FIG. 14.
Figure 18:
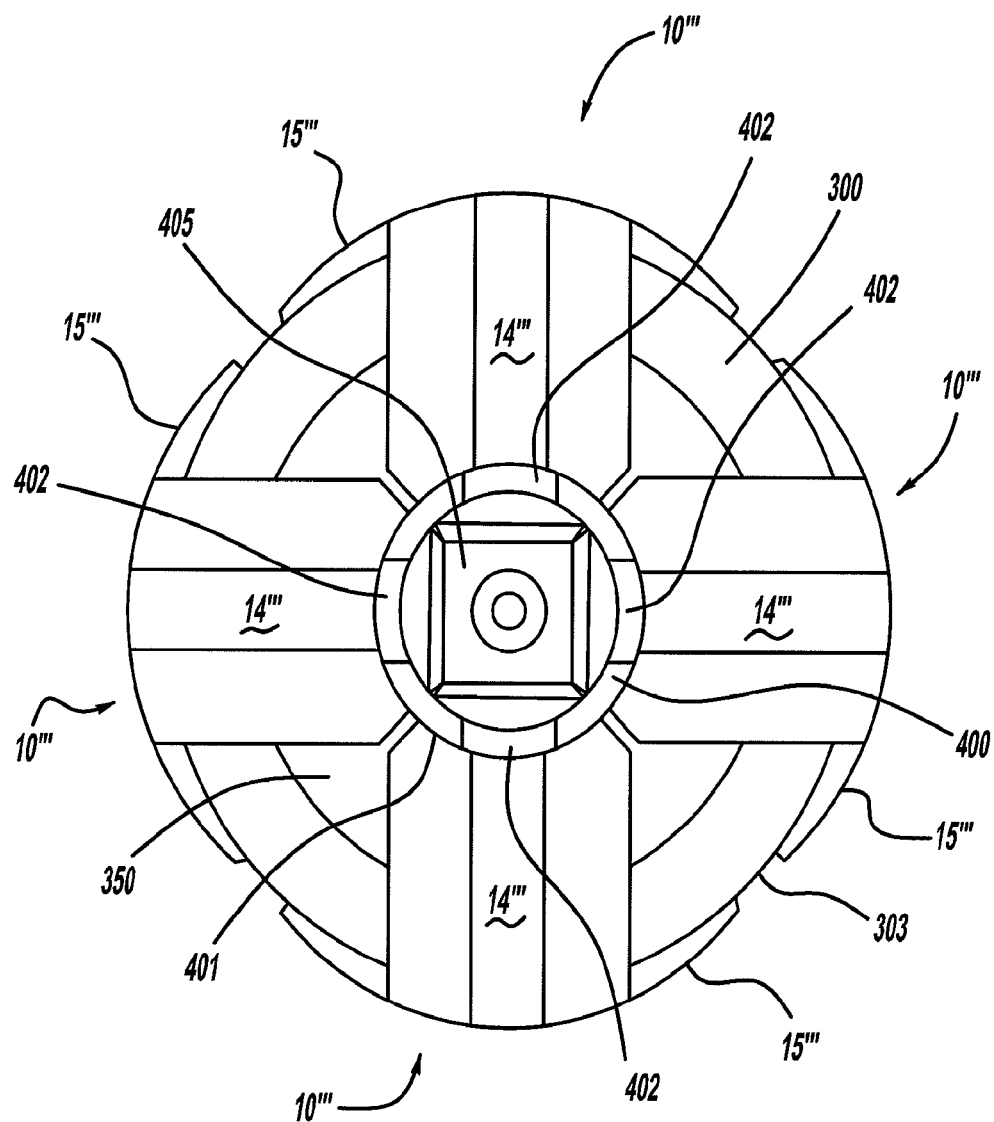
FIG. 18 is a cross-sectional elevation of the exemplary rotary valve of FIG. 17.

Except as otherwise noted, seal member 10''' is as heretofore described, and includes an annular flange 15''' of concave cross-section (as viewed from the top down where the flange 15''' defines the top of the seal member 10''' and the sealing face 13''' defines the bottom) extending radially from a central axis of the seal member 10''' defined coaxially with the longitudinal axis of the passageway 14'''. Referring particularly to FIGS. 17 and 18, flange 15''' is characterized by a tapered thickness proceeding radially outwardly from the said central axis to the flange peripheral edge 15a'''. A fluid passageway 14''' is defined through the stem portion 11''' between the flange 15'' and the sealing face 13'''.

In order that the seal members 10''' of this embodiment of the invention perform comparably to the seal members as heretofore described, it will be appreciated that the annular flange 15''' of each seal member 10''' has a smaller radius in cross-section than that of the upstream outer member 300. In this fashion, the flange 15''' of each seal member 10''' may be deformed under fluid pressure to increase the area of contact between the flange and the first surface 303 of the upstream member 300 and to simultaneously move the stem portion 11''' within the opening defined in the upstream member 300 so as to bring the sealing face 13''' into sealing contact with an opposing surface 401 of the downstream member 400 across the intermediate space 350.

Inner member 400 is rotatably moveable (by any conventional means appropriate to the application) relative to the outer member 300, so that the sealing faces 13''' may selectively be opposed by, and in radial alignment with, an opening of a respective one of the passageways 402 or the outer surface 401 of inner member 400 disposed intermediate those passageways 402. In this fashion, as those skilled in the art will appreciate, fluid communication between the outer 300 and inner 400 members may be selectively attenuated.

Per the illustrated embodiment, wherein a plurality of seal member 10''' are provided, opposite sides of the stem 11''' of each seal member 10''' proximate the sealing face 13''' may be chamfered 11a'''. According to this modification, as shown best in FIGS. 17 and 18, chamfered surfaces 11a''' of adjacent seal members 10''' are opposed so that each seal member 10''' may be brought into sealing contact with opposing surface 401 of the downstream member 400 without interference from an adjacent seal member 10'''.

From the foregoing description, it will be appreciated that the inventive sealing member addresses the disadvantages attending prior art sealing means in fluid transfer systems of the type wherein a fluid is selectively transferred through a fluid passageway defined between an upstream member and a downstream member separated by an intermediate space, by creating a sealing system that is dynamic in that it increases pressure at the sealing face while gradually and uniformly reducing the rate at which pressure is increased between the sealing face and the surface against which it seals, minimizing the increase of friction and resistance to movement while maintaining sealing contact. The sealing member thus is capable of compensating for considerable differences in component clearances and dimensional variations, even if the fluid transfer system in which it is employed experiences greatly varying pressures.

The foregoing description of the exemplary embodiments of the invention have been presented for purposes of illustration and description. They are not intended to be exhaustive of, or to limit, the invention to the precise forms disclosed, and modifications and variations are possible in light of the above teachings or may be acquired from practice of the invention. For instance, and without limitation, those skilled in the art will appreciate from the disclosure herein provided that the inventive seal member may be employed in an operational environment where the first surface of the upstream member against which the flange of the seal member is deformed under fluid pressure is characterized by a substantially flat geometry, as opposed to the curved geometries herein exemplified.

Thus, the embodiments shown and described are provided to explain the principals of the present invention and its practical application so as to enable one skilled in the art to utilize the invention in various embodiments and with various modifications as are suited to a particular use that may be contemplated. Accordingly, all such modifications and embodiments are intended to be included within the scope of the present invention. Other substitutions, modifications, changes and omissions may therefore be made in the design, operating conditions and arrangement of the exemplary embodiments without departing from the spirit of the present innovations.

The invention in which an exclusive property or privilege is claimed is defined as follows:

1. A seal member for selectively completing a fluid passageway defined between an upstream member and a downstream member separated by an intermediate space, the seal member comprising:
    an elongate stem portion dimensioned to be movably positionable in an opening defined through the upstream member between opposite first and second surfaces thereof, the elongate stem portion having provided at one end thereof a resiliently deformable, radially-extending flange and at the other end thereof a sealing face, and a fluid passageway defined through the stem portion between the flange and the sealing face; and
    wherein the flange is deformable under fluid pressure to increase the area of contact between the flange and the first surface of the upstream member and to simultaneously move the stem portion within the opening defined in the upstream member so as to bring the sealing face into sealing contact with an opposing surface of the downstream member across the intermediate space.

2. The seal member of claim 1, wherein the flange is an annular flange of convex cross-section extending radially away from a central axis of the seal member defined coaxially with a longitudinal axis of the fluid passageway through the stem.

3. The seal member of claim 2, wherein the flange is further characterized by a tapered thickness proceeding radially outwardly from the said central axis to a peripheral edge of the flange.

4. The seal member of claim 1, further comprising at least one guide rib on an outer surface of the stem portion.

5. The seal member of claim 4, wherein at least one of the at least one guide ribs has a forward taper to define a ramp.

6. The seal member of claim 5, wherein at least the at least one guide rib having the forward taper further includes a reverse taper.

7. The seal member of claim 1, wherein the sealing face is provided with one or more grooves dimensioned to permit a fluid to enter a sealing interface defined between the sealing face and an opposing surface of the downstream member.

8. The seal member of claim 7, wherein the one or more grooves comprise a plurality of discrete grooves.

9. The seal member of claim 7, wherein the one or more grooves comprise a single continuous groove.

10. The seal member of claim 1, wherein the sealing face is provided with one or more channels dimensioned to permit a fluid to enter a sealing interface defined between the sealing face and an opposing surface of the downstream member.

11. The seal member of claim 10, wherein the one or more channels comprise a plurality of discrete channels.

12. The seal member of claim 11, wherein the one or more channels comprise a plurality of tapered indentations in the surface of the sealing face, each tapered indentation opening onto a surface of the stem portion defining the fluid passageway thereof so that a supply of fluid is communicable from the fluid passageway and into each tapered indentation.

13. The seal member of claim 10, wherein the one or more channels comprise a single continuous channel.

14. The seal member of claim 13, wherein the single continuous channel divides the sealing face into a plurality of discrete sealing faces.

15. A rotary valve for selectively porting a fluid through one or more outlets, the rotary valve comprising:
    an upstream member having one or more outlet openings defined therethrough, and a downstream member having one or more outlet passageways defined therethrough, the downstream and upstream members separated by an intermediate space; and
    a seal member movably positioned in each outlet opening in the upstream member, each seal member comprising an elongate stem portion having provided at an upstream end thereof a resiliently deformable, radially-extending flange and at a downstream end thereof a sealing face, and a fluid passageway defined through the stem portion between the flange and the sealing face, the fluid passageway selectively communicating a fluid from the upstream member to the downstream member, and wherein the flange is deformable under fluid pressure in the upstream member to increase the area of contact between the flange and a first surface of the upstream member and to simultaneously move the stem portion within the outlet opening in the upstream member so as to bring the sealing face into sealing contact with an opposing surface of the downstream member across the intermediate space; and
    one or both of the upstream and downstream members being movable relative to each other to selectively align the fluid passageway of at least one of the one or more seal members with at least one of the one or more outlet passageways of the downstream member.

16. The rotary valve of claim 15, wherein the downstream member is disposed within the upstream member.

17. The rotary valve of claim 15, wherein the upstream member is disposed within the downstream member.

* * * * *